(12) United States Patent  (10) Patent No.: US 8,334,928 B2
Huang  (45) Date of Patent: Dec. 18, 2012

(54) AUTOMATIC OSD ADJUSTING DEVICE AND METHOD

(75) Inventor: Hung-Chi Huang, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 397 days.

(21) Appl. No.: 12/617,895

(22) Filed: Nov. 13, 2009

(65) Prior Publication Data

US 2010/0134686 A1  Jun. 3, 2010

(30) Foreign Application Priority Data

Dec. 1, 2008  (TW) .............................. 97146573 A

(51) Int. Cl.
*H04N 9/74* (2006.01)
(52) U.S. Cl. ...................................... 348/569
(58) Field of Classification Search .................. None
See application file for complete search history.

(56) References Cited

U.S. PATENT DOCUMENTS

| | | | | |
|---|---|---|---|---|
| 5,475,443 A * | 12/1995 | Kwon | ............................ | 348/569 |
| 6,181,353 B1 * | 1/2001 | Kurisu | ............................ | 345/537 |
| 6,396,486 B1 * | 5/2002 | Kuo et al. | ..................... | 715/700 |
| 6,542,162 B1 * | 4/2003 | Hrusecky et al. | ............ | 345/629 |
| 7,068,293 B2 * | 6/2006 | Wang | ............................ | 345/698 |
| 7,176,929 B1 * | 2/2007 | Morrish | ....................... | 345/545 |
| 7,191,402 B2 * | 3/2007 | Kim et al. | ..................... | 715/723 |
| 7,202,912 B2 * | 4/2007 | Aneja et al. | ................... | 348/569 |
| 7,428,018 B2 * | 9/2008 | Kim et al. | ..................... | 348/564 |
| 7,542,098 B2 * | 6/2009 | Mamba et al. | ............... | 348/569 |
| 8,054,383 B2 * | 11/2011 | Lee | ................ | 348/569 |
| 2003/0184563 A1 * | 10/2003 | Wiant, Jr. | ..................... | 345/629 |
| 2003/0189560 A1 * | 10/2003 | Kang et al. | .................... | 345/204 |
| 2004/0095358 A1 * | 5/2004 | Takagi et al. | ................. | 345/589 |
| 2004/0183823 A1 * | 9/2004 | Wang | ............................ | 345/699 |
| 2005/0163225 A1 * | 7/2005 | Im et al. | ..................... | 375/240.25 |
| 2006/0107214 A1 * | 5/2006 | Kim | ................ | 715/716 |
| 2006/0182366 A1 * | 8/2006 | Hsu et al. | ...................... | 382/274 |
| 2006/0232587 A1 * | 10/2006 | Oh | ................ | 345/467 |
| 2007/0052733 A1 * | 3/2007 | Hirabayashi et al. | ......... | 345/661 |
| 2007/0070081 A1 * | 3/2007 | Tang et al. | ..................... | 345/591 |
| 2007/0236607 A1 * | 10/2007 | Morris et al. | ................. | 348/563 |
| 2008/0002053 A1 * | 1/2008 | Kondo et al. | ................. | 348/441 |

* cited by examiner

*Primary Examiner* — Paulos M Natnael
(74) *Attorney, Agent, or Firm* — WPAT PC; Justin King

(57) ABSTRACT

An automatic OSD adjusting device and the associated method are provided. The device includes a receiving unit, a processing unit, an OSD unit and an OSD adjusting module. The receiving unit receives a video signal. The processing unit is coupled to the receiving unit and processes the video signal to generate a pixel signal. The OSD unit generates an OSD signal. The OSD adjusting module, coupled to the processing unit and the OSD unit, compares the OSD signal with the pixel signal to generate a comparison result, and selectively adjusts the OSD signal according to the comparison result.

16 Claims, 5 Drawing Sheets

AUTOMATIC OSD ADJUSTING DEVICE AND METHOD

CROSS REFERENCE TO RELATED PATENT APPLICATION

This patent application is based on Taiwan, R.O.C. patent application No. 097146573 filed on Dec. 1, 2008.

FIELD OF THE INVENTION

The present invention relates to an on-screen-display (OSD) adjusting device and method, and more particularly, to an automatic OSD adjusting device and method according to a pixel signal on a screen.

BACKGROUND OF THE INVENTION

A conventional screen, e.g., a computer monitor or a television screen, generally supports an on-screen-display (OSD) function. The main purpose of the OSD is to allow a user to be acquainted with statuses of a video image being displayed on the screen or statuses of information associated with the monitor, such as channel information, brightness, contrast and volume.

A common approach for implementing the OSD is to directly show the OSD on the screen, in such a way that the OSD overlaps with a video image that is currently being displayed. It is to be reminded that a form of the OSD is a predetermined, fixed manufacturer setting that cannot be changed by the user, and yet in contrast, video images displayed on the screen are constantly varying. Thus, supposing the OSD is always displayed in a predetermined setting, for example, supposing a color of the OSD stays fixed while the video image changes to a color close to that of the OSD, complications are caused for that the OSD may appear indistinguishable from the video image.

In view of the foregoing drawback, the invention provides an automatic OSD adjusting device which automatically adjusts a displaying approach of the OSD along with changes of video images of a screen, thereby facilitating a user to easily identify the OSD within the video images.

SUMMARY OF THE INVENTION

It is one objective of the invention is to provide an OSD adjusting device, which selectively adjusts an OSD according to a comparison result between an OSD signal and a pixel signal.

It is another objective of the invention to provide an OSD adjusting method for generating an adjusted OSD signal.

Therefore, the invention provides an automatic OSD adjusting device comprising a receiving unit, a processing unit, an OSD unit, and an OSD adjusting module. The receiving unit receives a video signal. The processing unit, coupled to the receiving unit, processing the video signal to generate a pixel signal. The OSD unit generates an OSD signal. The OSD adjusting module, coupled to the processing unit and the OSD unit, compares the OSD signal with the pixel signal to generate a comparison result, and selectively adjusts the OSD signal according to the comparison result.

The invention further provides an automatic OSD adjusting method. The method comprises steps of receiving a video signal, processing the video signal to generate a pixel signal, generating an OSD signal, comparing the OSD signal with the pixel signal to generate a comparison result, and selectively adjusting the OSD signal according to the comparison result.

With the automatic OSD adjusting device and method according to the invention, drawbacks of the rather unnoticeable contrast and inadequate differentiation resulted from a predetermined OSD of the prior art are effectively eliminated.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
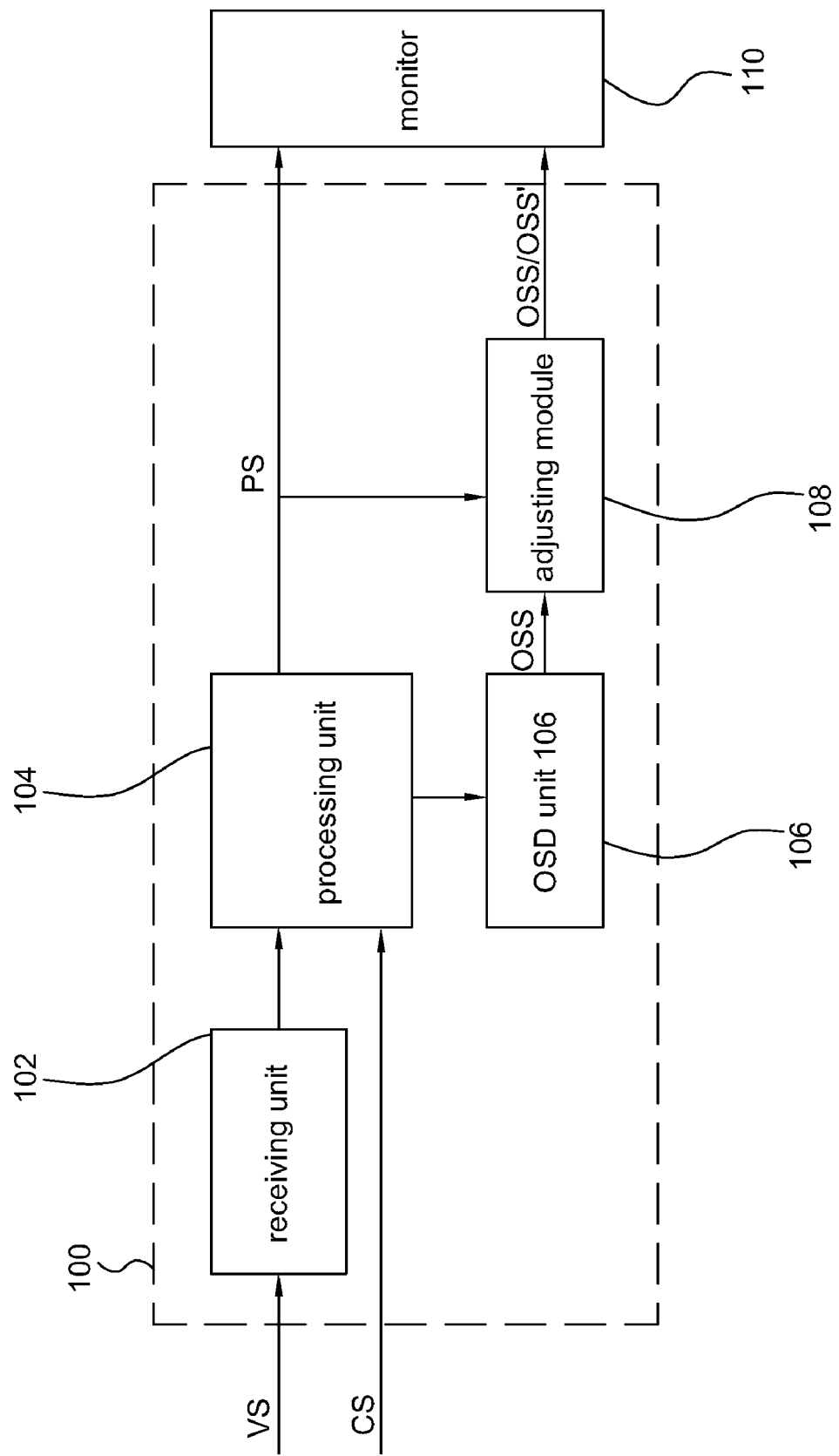
FIG. 1 is a functional block diagram of an automatic OSD adjusting device according to one embodiment of the invention.

FIG. 1 shows a block diagram of an automatic OSD adjusting device 100 according to one embodiment of the invention. In this embodiment, the automatic OSD adjusting device 100 comprises a receiving unit 102, a processing unit 104, an OSD unit 106, and an OSD adjusting module 108. Further, the automatic OSD adjusting device 100 is applied to a monitor 110 (e.g., an LCD monitor), and is preferably implemented as a single integrated circuit or as a combination of multiple integrated circuits.

The receiving unit 102 receives a video signal VS, e.g., an analog television signal, a digital video signal, or a digital television signal comprising at least a channel signal. The processing unit 104 is coupled to the receiving unit 102, and processes the video signal VS to generate a pixel signal PS. A series of pixel signals PS become capable of driving pixels on the LCD monitor 110 to provide an image. The processing unit 104 may also receive a control signal CS, according to which the processing unit 104 processes the video signal VS, e.g., switching channels, adjusting the volume or adjusting the brightness, or generates an electronic program guide (EPG). The OSD unit 106 is coupled to the processing unit 104, and is controlled by the processing unit 104 to generate an OSD signal OSS representing, e.g., a display channel number, brightness, contrast, volume and an EPG.

The OSD adjusting module 108 is coupled to the processing unit 104 and the OSD unit 106, and is for comparing the pixel signal PS with the OSD signal OSS to generate a comparison result. According to the comparison result, the OSD adjusting module 108 selectively adjusts the OSD signal OSS into an adjusted OSD signal OSS', and transmits the OSD signal OSS/OSS' to the monitor 110 for display. Therefore, the OSD is displayed on the monitor 110 in an overlapping manner with the image representing the pixel signals PS.

It is to be noted that, the pixel signals PS may first be combined with the OSD signal OSS/OSS', and then outputted to and displayed on the monitor 110. Alternatively, the OSD signal OSS/OSS' and the pixel signals PS are respectively transmitted to the monitor 110, and displayed together on the monitor 110.

Figure 2B:
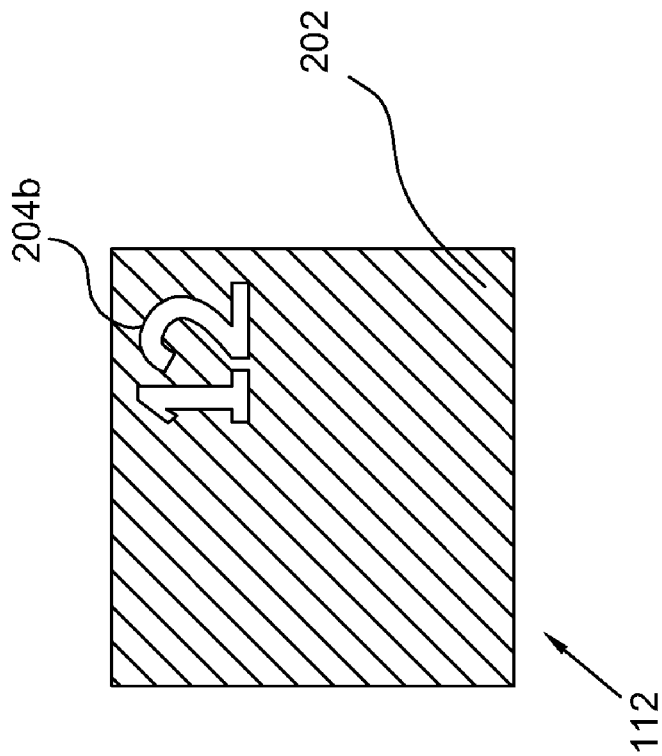
FIGS. 2A and 2B are examples of an OSD.
Figure 2A:
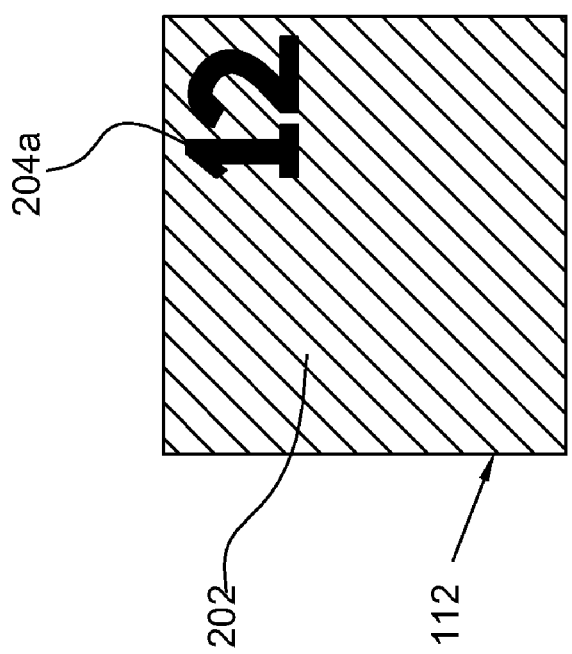

FIGS. 2A and 2B show examples of displaying the OSD. For example, on a screen 112 of an LCD monitor in FIG. 2A, an image 202 is generated from driving pixels by the pixel signals PS on the screen 112. In FIG. 2A, an OSD signal 204a corresponding to the OSD signal OSS is also displayed to represent, e.g., channel information of a television station.

However, it is possible that the OSD signal 204a and the image 202 may be displayed in similar or even identical colors, meaning that one may not easily distinguish the OSD signal 204a from the image 202. For example, in this embodiment, the OSD signal 204a is displayed in black, and the image 202 is displayed in dark gray (indicated in slanted lines). As a result of an overlapped display effect, it is likely that one may find it difficult to read the OSD signal 204a. With reference to FIG. 2B, according to an approach of automatically adjusting the OSD, the OSD signal 204a in FIG. 2A is adjusted by the automatic OSD adjusting device to an adjusted OSD signal 204b clearly distinguishable from the gray image 202. For example, in this embodiment, the originally black OSD signal 204a is adjusted into the white OSD signal 204b, so that one is allowed to clearly identify the white OSD signal 204b from the gray image 202.

Figure 3:
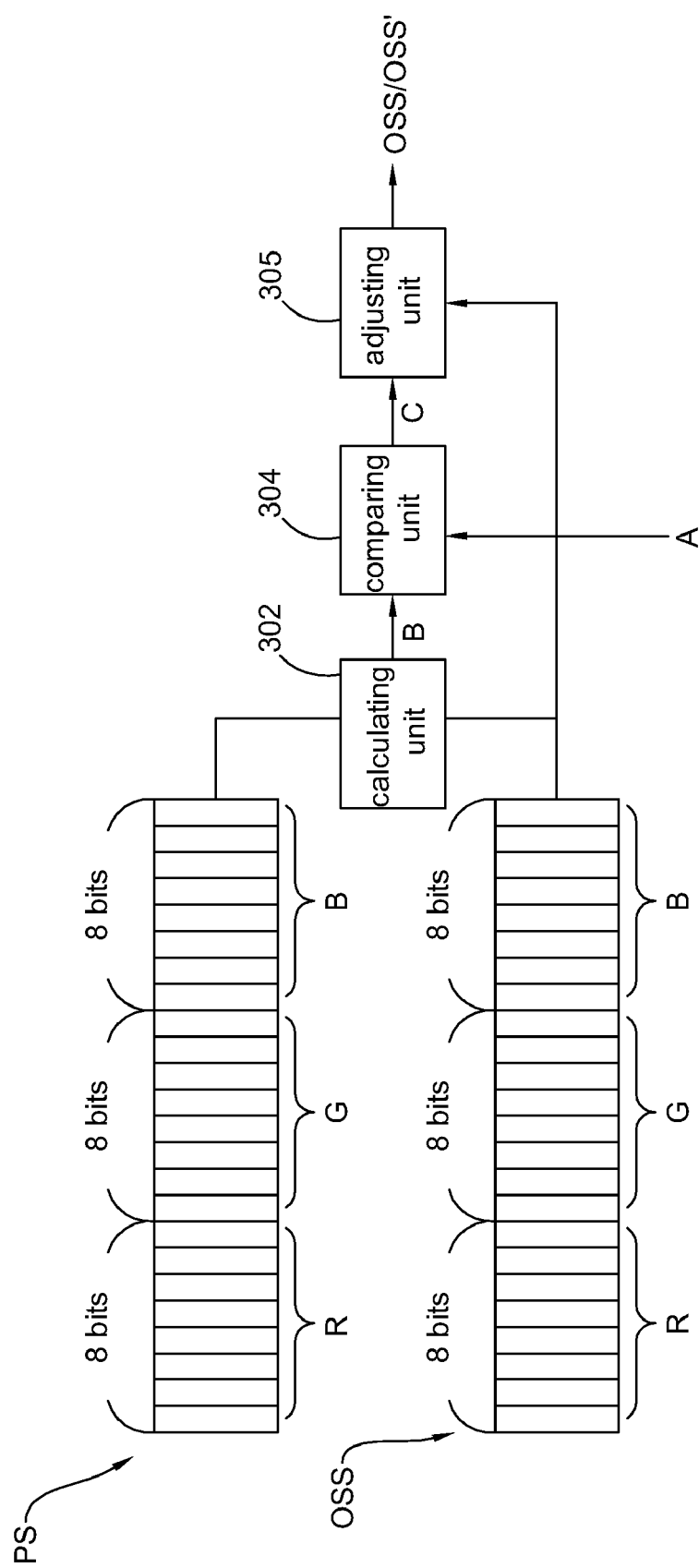
FIG. 3 is a first embodiment of the OSD adjusting module in FIG. 1.

FIG. 3 shows a first embodiment of the OSD adjusting module in FIG. 1. In this embodiment, the pixel signal PS and the OSD signal OSS are RGB signals, for example. An RGB signal comprising R, G and B components (to be referred to as RGB components) respectively representing R, G and B primary colors may present various colors through different R, G and B values (to be referred to as RGB values) and ratios. The RGB values are expressed in n bits to represent corresponding RGB components, and may range from 0 to $2^{n-1}$. For example, supposing n bits is 8 bits and each of the RGB value ranges between 0 and 255, a set of corresponding RGB values then ranges between (0,0,0)~(255,255,255). For example, to have the pixel signal PS display blue on the image, a corresponding set of RGB values of (0,0,255) is provided.

Further, according to the automatic OSD adjusting device 100, several approaches for determining whether to automatically adjust the OSD may be implemented. For example, in a first approach, the OSD adjusting module 108 first calculates a sum of absolute differences (SAD) between the RGB components of the pixel signal PS and the OSD signal OSS to generate a comparison result, and compares the comparison result with a threshold, e.g., $2^{n-1}$. When the comparison result is greater than the threshold, the OSD adjusting module 108 leaves the OSD signal OSS intact; when the comparison result is smaller than the threshold, the OSD adjusting module 108 adjusts the OSD signal OSS. In a second approach, when adjusting the OSD signal OSS with the OSD adjusting module 108, the values of the RGB components of the pixel signal PS are subtracted from $2^n$ to generate a set of complementary values of the pixel signal PS. When the SAD between the set of complementary values and the values of the RGB components of the pixel signal PS is greater than the threshold, the set of complementary values is utilized as the RGB components of the OSD signal OSS. When the SAD between the set of complementary values and the values of the RGB components of the pixel signal PS is smaller than the threshold, each component of the set of complementary values is adjusted, and the adjusted set of complementary values is utilized as the RGB components of the OSD signal OSS. In a third approach, when adjusting the OSD signal OSS with the OSD adjusting module 108, a set of RGB values is located from a look-up table, and the set of RGB values located then serves as the RGB components of the OSD signal OSS. Details of the three approaches shall be discussed below with reference to FIG. 3.

According to the first approach, the OSD adjusting module 108 respectively compares the values of the RGB components of the pixel signal PS and the OSD signal OSS. For example, using a calculating unit 302, corresponding RGB values of the pixel signal PS and the OSD signal OSS are subtracted from each other to first obtain absolute values, which are then added to generate an RGB comparison result B. Next, a comparing unit 304 compares a threshold A with the comparison result B to obtain an indication signal C. In one embodiment, when the comparison result B is greater than the threshold A, it means that a remarkable difference exists between the pixel signal PS and the OSD signal OSS, and thus an adjusting unit 305 leaves the OSD signal OSS intact; when the comparison result B is smaller than the threshold A, it means that a difference between the pixel signal PS and the OSD signal OSS is rather unnoticeable, and thus the adjusting unit 305 adjusts the OSD signal OSS to make the difference between the adjusted OSD signal OSS' and the pixel signal PS much more apparent.

According to the second approach, the calculating unit 302 of the OSD adjusting module 108 respectively subtracts the values of the RGB components of the pixel signal PS from $2^n$ to generate a set of complementary values of the pixel signal PS. The set of complementary values are utilized as the RGB components of the OSD signal, and is compared with the RGB components of the pixel signal PS to generate the comparison result B. Next, the comparing unit 304 compares the threshold A with the comparison result B to generate the indication signal C. In one embodiment, when the indication signal C indicates that B is greater than the threshold A, the adjusting unit 305 leaves the OSD signal comprising the set of complementary values intact; when the indication signal C indicates that B is smaller than the threshold A, the adjusting unit 305 adjusts the OSD signal OSS to output OSS' to make the difference between the OSD signal OSS' and the pixel signal PS much more apparent.

According to the third approach, the OSD adjusting module 108 subtracts corresponding RGB values of the pixel signal PS and the OSD signal OSS from each other to generate a comparison result B, base on which a set of RGB values corresponding to the comparison result B is located by means of a look-up table. The set of RGB values then serves as the RGB components of the adjusted OSD signal OSS' to be displayed.

Figure 4:
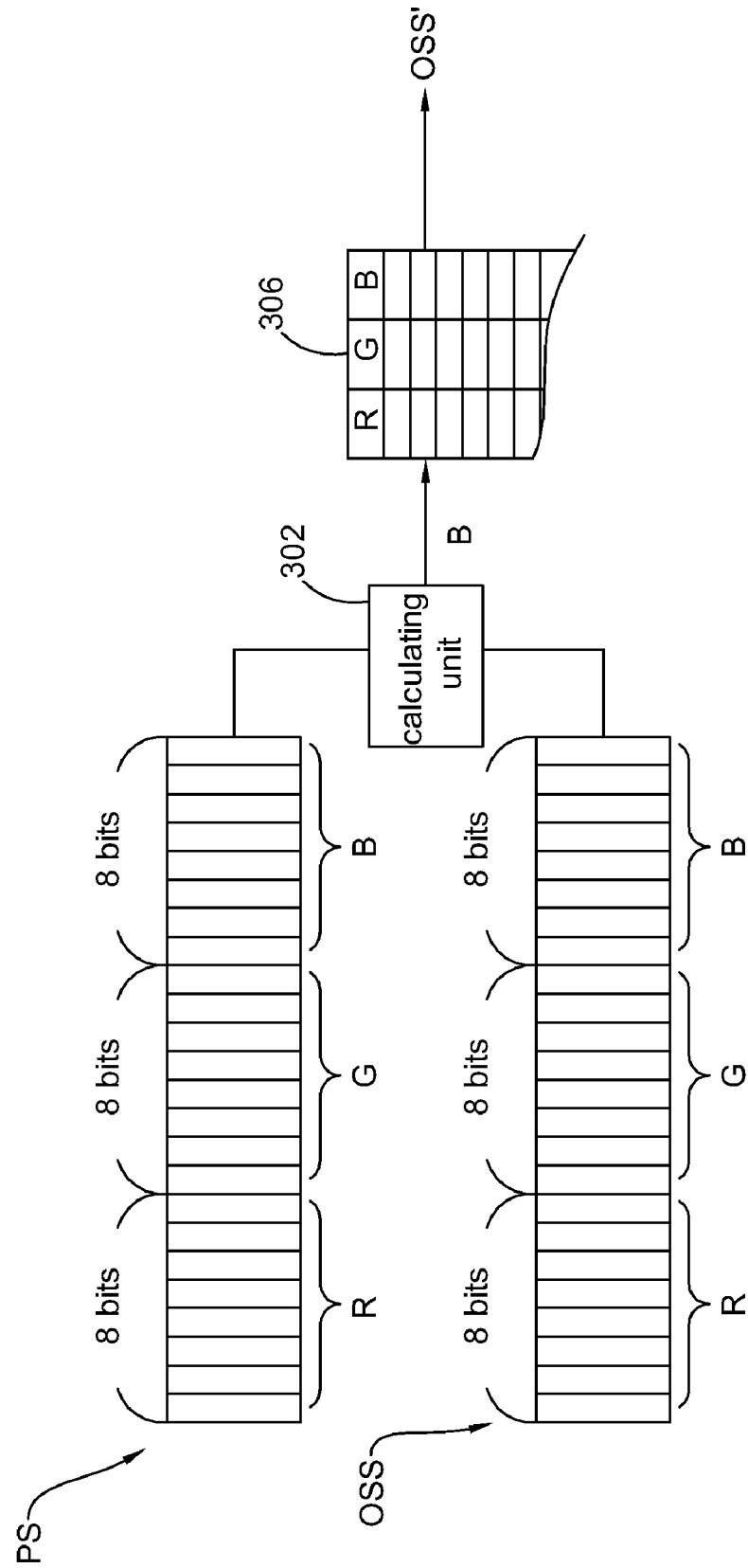
FIG. 4 is a second embodiment of the OSD adjusting module in FIG. 1.

FIG. 4 shows a functional block diagram of the OSD adjusting module in FIG. 1 according to the third approach. The calculating unit 302 calculates the corresponding RGB values of the pixel signal PS and the OSD signal OSS to generate a comparison result B. By means of a look-up table, a set of RGB values corresponding to the comparison result B is located to serve as the RGB components of the OSD signal OSS'.

Figure 5:
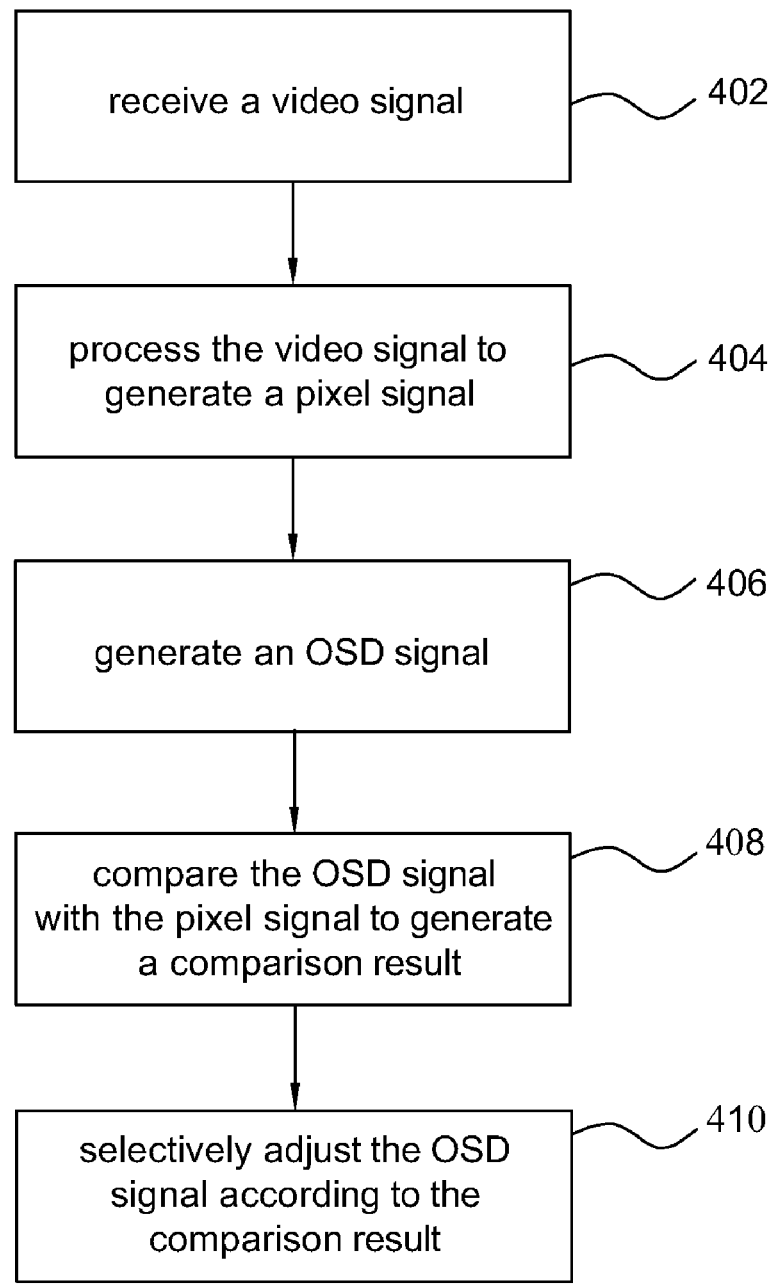
FIG. 5 is a flowchart of an automatic OSD adjusting method according to another embodiment of the invention.

FIG. 5 shows a flowchart of an automatic OSD adjusting method according to another embodiment of the invention. The method, applied to the automatic OSD adjusting device 100 shown in FIG. 1, begins with Step 402 of receiving a video signal. In Step 404, the video signal is processed to generate a pixel signal. In Step 406, an OSD signal is generated, followed by Step 408, in which the OSD signal is compared with the pixel signal to generate a comparison result. In Step 410, the OSD signal is selectively adjusted according to the comparison result.

For example, the foregoing pixel signal and the OSD signal are RGB signals, with components of the RGB signals being represented in n bits. Further, the comparison result may be, for example, an SAD between the values of the RGB components of the pixel signal and the OSD signal. In the step of comparing the comparison result, the comparison result is compared with a threshold, e.g., $2^{n-1}$ in one embodiment; when the comparison result is smaller than the threshold, the step of adjusting the OSD signal is performed. Alternatively, in the step of comparing the comparison result, the values of the RGB components of the pixel signal are subtracted from $2^n$ to generate a set of complementary values of the pixel signal. When an SAD between the set of complementary values and the values of the RGB components of the pixel signal is greater than the threshold, the set of complementary values are utilized as the RGB components of the OSD signal OSS; when the SAD between the set of complementary values and the values of the RGB components of the pixel signal is smaller than the threshold, the set of the complementary values is adjusted to be utilized as the RGB components of the OSD signal. Alternatively, by means of a look-up table, a set of RGB values is located to serve as the RGB components of the OSD signal OSS.

In the above embodiments, the OSD is capable of being displayed at any location of an image shown on a monitor. The OSD signal may be compared with a pixel signal of any single pixel of an image or pixel signals of a plurality of pixels. When comparing pixel signals of a plurality of pixels, the OSD signal may be compared with an average of the pixel signals, for example. Further, a display location of the pixel signals being compared may overlap or be adjacent with a display location of the OSD signal; that is, a location where the OSD signal and the pixels signals are compared is unrestricted.

Compared to the prior art, the automatic OSD adjusting device and method according to the invention effectively eliminates drawbacks of the rather unnoticeable contrast and inadequate differentiation resulted from a predetermined OSD of the prior art.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An automatic on-screen-display (OSD) adjusting device, comprising:
   a receiving unit, for receiving a video signal;
   a processing unit, coupled to the receiving unit, for processing the video signal and to generate a pixel signal;
   an OSD unit, for generating an OSD signal; and
   an OSD adjusting module, coupled to the processing unit and the OSD unit, for generating a comparison result by comparing the OSD signal with the pixel signal, and for adjusting the OSD signal when the comparison result is compared to a threshold;
   wherein the OSD adjusting module calculates a sum of absolute difference (SAD) using the pixel signal and the OSD signal to generate the comparison result.

2. The device as claimed in claim 1, wherein the pixel signal and the OSD signal are RGB signals representing in n bits, and n is an integer.

3. The device as claimed in claim 2, wherein the OSD adjusting module calculates a sum of absolute differences (SAD) between a first plurality of RGB components in the pixel signal and a second plurality of RGB components in the OSD signal to generate a comparison result.

4. The device as claimed in claim 2, wherein the OSD adjusting module adjusts the OSD signal when the comparison result is smaller than a threshold.

5. The device as claimed in claim 4, wherein the threshold is $2^{n-1}$ and n is an integer.

6. The device as claimed in claim 4, wherein when the OSD adjusting module adjusts the OSD signal, the OSD adjusting module generates a set of complementary values by subtracting a first plurality of RGB components of the pixel signal from $2^n$, the set of complementary values serve as a second plurality of RGB components of the OSD signal, and n is an integer.

7. The device as claimed in claim 6, wherein when an SAD between the first plurality of RGB components and the second plurality of RGB components is smaller than the threshold, the OSD adjusting module adjusts the second plurality of RGB components of the OSD signal.

8. The device as claimed in claim 1, wherein when the OSD adjusting module adjusts the OSD signal, the OSD adjusting module selects a set of RGB values from a look-up table for the OSD signal.

9. An automatic OSD adjusting method, comprising:
   receiving a video signal;
   processing the video signal to generate a pixel signal;
   generating an OSD signal;
   comparing the OSD signal with the pixel signal to generate a comparison result; and
   adjusting the OSD signal when the comparison result is compared to a threshold;
   wherein the OSD adjusting step calculates a sum of absolute difference (SAD) using the pixel signal and the OSD signal to generate the comparison result.

10. The method as claimed in claim 9, wherein the pixel signal and the OSD signal are RGB signals representing in n bits, and n is an integer.

11. The method as claimed in claim 10, wherein the comparison result is a sum of absolute differences (SAD) between a first plurality of RGB components of the pixel signal and a second plurality of RGB components of the OSD signal.

12. The method as claimed in claim 10, further comprising:
   comparing the comparison result with a threshold; and
   performing the step of adjusting the OSD signal when the comparison result is smaller than the threshold.

13. The method as claimed in claim 12, wherein the threshold is $2^{n-1}$, and n is an integer.

14. The method as claimed in claim 12, wherein the step adjusting the OSD signal comprises:
   generating a set of complementary values by subtracting a first plurality of RGB components of the pixel signal from $2^n$, and n is an integer; and
   utilizing the set of complementary value as a second plurality of RGB components of the OSD signal.

15. The method as claimed in claim 14, wherein the step of adjusting the OSD signal further comprises:
   adjusting the second plurality of RGB component when an SAD between the first plurality of the RGB components and the second plurality of RGB components is smaller than the threshold; and
   utilizing the adjusted second plurality of RGB components for the OSD signal.

16. The method as claimed in claim 9, wherein the step of adjusting the OSD signal comprises:
   determining a set of RGB values according to a look-up table; and
   utilizing the set of RGB values as RGB components of the OSD signal.

* * * * *